(12) United States Patent
Kurasawa et al.

(10) Patent No.: US 11,453,264 B2
(45) Date of Patent: Sep. 27, 2022

(54) VEHICLE HEAT MANAGEMENT SYSTEM

(71) Applicant: SUBARU CORPORATION, Tokyo (JP)

(72) Inventors: Shinya Kurasawa, Tokyo (JP); Yasukazu Nobumoto, Tokyo (JP); Yutaka Sato, Tokyo (JP); Tatsuya Kaneko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 82 days.

(21) Appl. No.: 16/502,638

(22) Filed: Jul. 3, 2019

(65) Prior Publication Data

US 2020/0101815 A1    Apr. 2, 2020

(30) Foreign Application Priority Data

Sep. 28, 2018  (JP) .............................. JP2018-185259

(51) Int. Cl.
  *B60H 1/00*    (2006.01)
(52) U.S. Cl.
  CPC ..... *B60H 1/00278* (2013.01); *B60H 1/00428* (2013.01)
(58) Field of Classification Search
  CPC ...... B60H 1/00278; B60H 2001/00928; B60H 1/038; B60H 1/32284
  See application file for complete search history.

(56) References Cited

U.S. PATENT DOCUMENTS

| | | | |
|---|---|---|---|
| 2008/0251235 A1 | 10/2008 | Zhou | |
| 2012/0067545 A1* | 3/2012 | Yamazaki | F01M 5/00 165/52 |
| 2015/0202986 A1 | 7/2015 | Hatakeyama et al. | |
| 2015/0362268 A1 | 12/2015 | Maeda | |
| 2018/0117991 A1* | 5/2018 | Kim | B60H 1/00899 |
| 2018/0178615 A1* | 6/2018 | Xia | B60L 58/26 |
| 2018/0222286 A1* | 8/2018 | Blatchley | H01M 10/6567 |
| 2018/0272834 A1* | 9/2018 | Hahn | B60L 58/26 |
| 2018/0272877 A1* | 9/2018 | Sakowski | H01M 10/663 |
| 2020/0101810 A1* | 4/2020 | Takagi | B60H 1/00028 |
| 2020/0101815 A1* | 4/2020 | Kurasawa | B60H 1/00278 |

FOREIGN PATENT DOCUMENTS

| | | |
|---|---|---|
| JP | 2002-354608 A | 12/2002 |
| JP | 2014-37178 A | 2/2014 |
| JP | 2014-136567 A | 7/2014 |
| JP | 2015-93561 A | 5/2015 |

OTHER PUBLICATIONS

Notice of Reasons for Refusal dated May 31, 2022 in Japanese Patent Application No. 2018-185259, with machine translation.

* cited by examiner

*Primary Examiner* — Emmanuel E Duke
(74) *Attorney, Agent, or Firm* — Troutman Pepper Hamilton Sanders LLP

(57) ABSTRACT

A vehicle heat management system includes a refrigerant circuit, a heating circuit, and a battery temperature regulation circuit. The refrigerant circuit circulates a refrigerant to regulate a temperature inside a passenger compartment through the refrigerant circuit. The heating circuit circulates a liquid that exchanges heat with the refrigerant through the heating circuit. The heating circuit regulates the temperature inside the passenger compartment. The battery temperature regulation circuit regulates a temperature of a battery by introducing a liquid that exchanges heat with the refrigerant to the battery.

11 Claims, 13 Drawing Sheets

VEHICLE HEAT MANAGEMENT SYSTEM

CROSS-REFERENCE TO RELATED APPLICATIONS

The present application claims priority from Japanese Patent Application No. 2018-185259 filed on Sep. 28, 2018, the entire contents of which are hereby incorporated by reference.

BACKGROUND

The disclosure relates to a vehicle heat management system.

In the related art, Japanese Unexamined Patent Application Publication (JP-A) No. 2014-037178 below relates to an electric vehicle heat management system installed in an electric vehicle, and describes how a refrigerant loop for air conditioning and a refrigerant loop for a battery exchange heat through a chiller in a single location.

SUMMARY

An aspect of the disclosure provides a vehicle heat management system including a refrigerant circuit, a heating circuit, and a battery temperature regulation circuit. The refrigerant circuit is configured to circulate a refrigerant to regulate a temperature inside a passenger compartment therethrough. The heating circuit is configured to circulate a liquid that exchanges heat with the refrigerant therethrough. The heating circuit is configured to regulate the temperature inside the passenger compartment. The battery temperature regulation circuit is configured to regulate a temperature of a battery by introducing a liquid capable of exchanging heat with the refrigerant to the battery.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
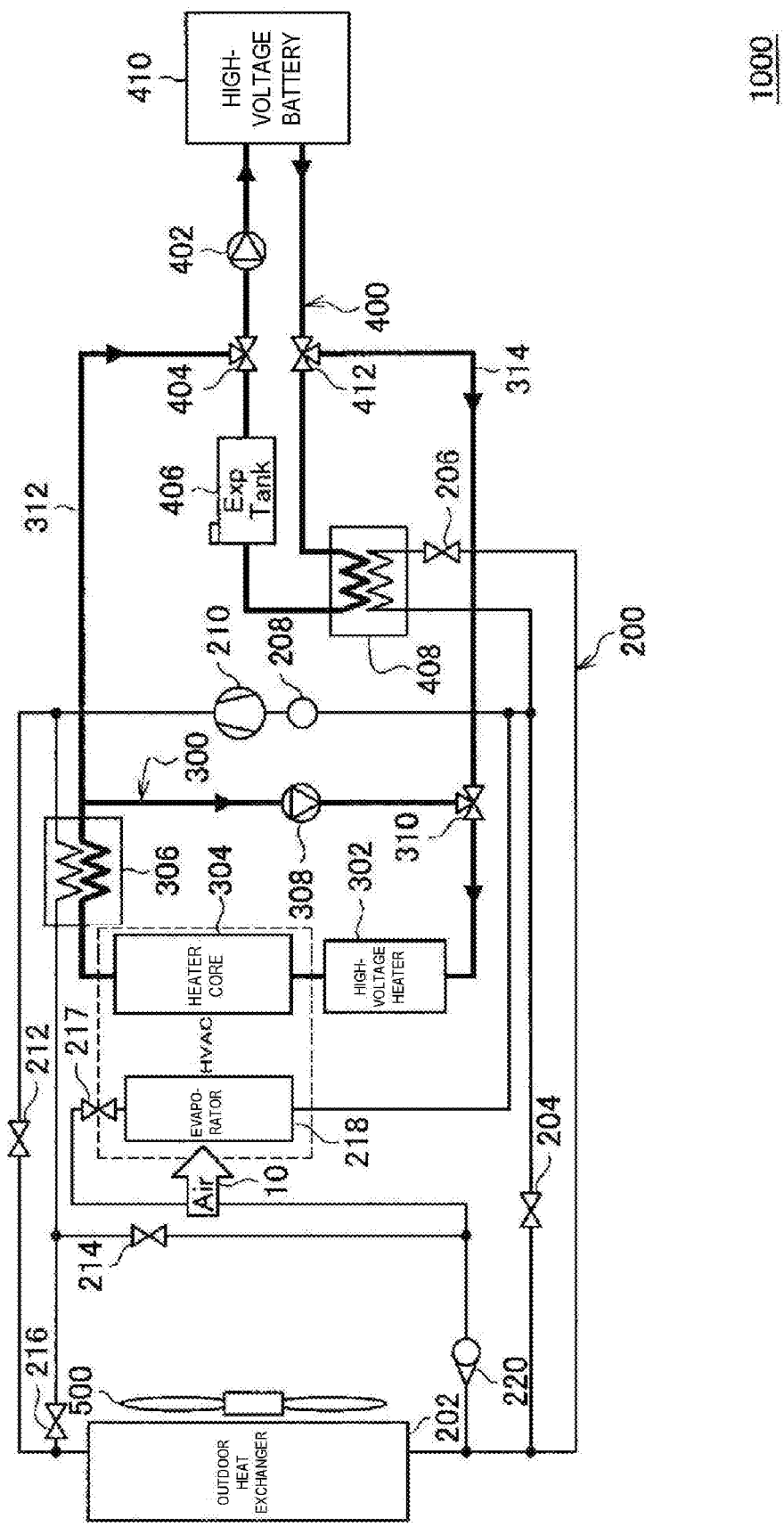
FIG. 1 is a schematic diagram illustrating a schematic configuration of a vehicle heat management system according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

In the technology described in JP-A No. 2014-037178 above, since only the simple exchange of heat is executed between the refrigerant loop for air conditioning and the refrigerant loop for the battery, under conditions in which the temperature of the refrigerant cannot be controlled optimally because of the outdoor air temperature or the like for example, it is difficult to bring the battery temperature to a suitable temperature.

Particularly, in an electric vehicle, since the amount of generated heat and the demanded temperature of a high-voltage part to be cooled is lower than an ordinary vehicle using an internal combustion engine, it becomes more difficult to create a temperature difference in the heat exchanger. Also, for heating, since an internal combustion engine to act as a heat source does not exist in an electric vehicle, and a sufficient amount of heat is not obtained from the waste heat of the high-voltage part, it is necessary to provide separate devices for generating heat, and the efficiency of these devices greatly influences the energy efficiency. For this reason, in the case in which multiple objects of temperature adjustment exist, multiple devices needed for cooling and heating also become necessary, and control also becomes more complicated, leading to increased cost and weight of the vehicle.

It is desirable to provide a novel and improved vehicle heat management system capable of regulating the temperature inside the passenger compartment and regulating the temperature of the battery optimally with a simple configuration.

1. Configuration of Heat Management System

First, FIG. 1 will be referenced to describe a schematic configuration of a heat management system 1000 of a vehicle according to an embodiment of the disclosure. The heat management system 1000 is installed in a vehicle such as an electric vehicle. As illustrated in FIG. 1, the heat management system 1000 includes a refrigerant circuit 200, a heating circuit 300, and a battery temperature regulation circuit 400. In the heat management system 1000, the regulation of the temperature inside the passenger compartment and the regulation of the temperature of the battery for driving the vehicle are realized by the combination of the refrigerant circuit 200, the heating circuit 300, and the battery temperature regulation circuit 400.

1.1. Configuration of Refrigerant Circuit

The refrigerant circuit 200 is coupled to an outdoor heat exchanger 202, a low-voltage solenoid valve 204, a chiller expansion valve 206, an accumulator 208, a motorized compressor 210, a water-cooled condenser bypass solenoid valve 212, a high-voltage solenoid valve 214, a heating solenoid valve 216, a cooling expansion valve 217, an evaporator 218, a check valve 220, a water-cooled condenser 306, and a chiller 408.

When a cooling fan 500 rotates, air produced by the cooling fan 500 hits the outdoor heat exchanger 202 of the refrigerant circuit 200. With this arrangement, heat is exchanged at the outdoor heat exchanger 202, and refrigerant flowing through the outdoor heat exchanger 202 is cooled.

Also, as illustrated in FIG. 1, in the refrigerant circuit 200, refrigerant flows in the direction of the arrows according to the operation of the motorized compressor 210. The accumulator 208 provided on the upstream side of the motorized compressor 210 has a function of separating gas and liquid refrigerant.

In the refrigerant circuit 200, refrigerant compressed by the motorized compressor 210 is cooled by the outdoor heat exchanger 202, and by being injected into the evaporator 218 by the cooling expansion valve 217, the refrigerant gasifies and cools the evaporator 218. Subsequently, air 10 sent to the evaporator 218 is cooled, and by introducing this air 10 into the passenger compartment, the passenger compartment is cooled. The refrigerant circuit 200 principally cools, dehumidifies, and heats the passenger compartment.

Additionally, in the embodiment, the refrigerant circuit 200 also regulates the temperature of a high-voltage battery 410. The regulation of the temperature of the high-voltage battery 410 by the refrigerant circuit 200 will be described in detail later.

1.2. Configuration of Heating Circuit

The heating circuit 300 is coupled to a high-voltage heater 302, a heater core 304, the water-cooled condenser 306, a water pump 308, and a three-way valve 310. Also, the heating circuit 300 is coupled to three-way valves 404 and 412 of the battery temperature regulation circuit 400 via channels 312 and 314. The heating circuit 300 principally heats the passenger compartment. Additionally, in the embodiment, the heating circuit 300 also regulates the temperature of the high-voltage battery 410.

In the heating circuit 300, a liquid (LLC) for heating flows. The liquid flows in the direction of the arrows according to the operation of the water pump 308. When the high-voltage heater 302 operates, the liquid is warmed by the high-voltage heater 302. The air 10 sent to the evaporator 218 hits the heater core 304. The air 10 sent to the evaporator 218 is warmed by the heater core 304 and introduced into the passenger compartment. With this arrangement, the passenger compartment is heated. The evaporator 218 and the heater core 304 may also be configured as a singular device.

The water-cooled condenser 306 exchanges heat between the heating circuit 300 and the refrigerant circuit 200. The regulation of the temperature of the high-voltage battery 410 by the heating circuit 300 will be described in detail later.

1.3. Configuration of Battery Temperature Regulation Circuit

The battery temperature regulation circuit 400 is coupled to a water pump 402, the three-way valve 404, an expansion tank 406, the chiller 408, the high-voltage battery 410, and the three-way valve 412. The battery temperature regulation circuit 400 regulates the temperature of the high-voltage battery 410.

In the battery temperature regulation circuit 400, a liquid (LLC) for regulating the temperature of the high-voltage battery 410 flows. The liquid flows in the direction of the arrows according to the operation of the water pump 402. The liquid is introduced into the chiller 408. The chiller 408 exchanges heat between the liquid flowing through the battery temperature regulation circuit 400 and the refrigerant flowing through the refrigerant circuit 200. The expansion tank 406 is a tank that temporarily stores liquid.

As described above, the battery temperature regulation circuit 400 also regulates the temperature of the high-voltage battery 410. The regulation of the temperature of the high-voltage battery 410 by the battery temperature regulation circuit 400 will be described in detail later.

1.4. Regulation of Temperature of High-Voltage Battery

When the temperature of the high-voltage battery 410 rises moderately, the electric power generated by the high-voltage battery 410 increases. In the embodiment, by regulating the temperature of the high-voltage battery 410 with the refrigerant circuit 200 and the heating circuit 300, it is possible to regulate the temperature of the high-voltage battery 410 optimally and cause the high-voltage battery 410 to exhibit high output. For example, when starting the vehicle in the winter or the like, since the high-voltage battery 410 is cold, it may not be possible to exhibit sufficient output in some cases. Also, when charging the high-voltage battery 410, the high-voltage battery 410 generates heat, and the temperature of the high-voltage battery 410 may rise excessively in some cases. Likewise in such cases, by regulating the temperature of the high-voltage battery 410 with the refrigerant circuit 200 and the heating circuit 300, it is possible to regulate the temperature of the high-voltage battery 410 optimally. Note that the regulation of the temperature of the high-voltage battery 410 preferably is executed according to a feedback control based on a measured value of the temperature of the high-voltage battery 410.

2. Exemplary Operations of Heat Management System

Next, the operations of the heat management system 1000 configured as above will be described. To cool, dehumidify, and heat the passenger compartment and also to regulate the temperature of the high-voltage battery 410, various types of heat exchange are performed. In the following, these operations in the heat management system will be described. Note that each operation is merely an example, and the control for achieving each operation is not limited to what is given as an example. In the following description, the operating states of the low-voltage solenoid valve 204, the chiller expansion valve 206, the water-cooled condenser bypass solenoid valve 212, the high-voltage solenoid valve 214, the heating solenoid valve 216, the three-way valve 310, the three-way valve 404, and the three-way valve 412 will be illustrated in the diagrams as solid white to denote the open state and as solid black to denote the closed state.

2.1. Cooling Passenger Compartment

Figure 2:
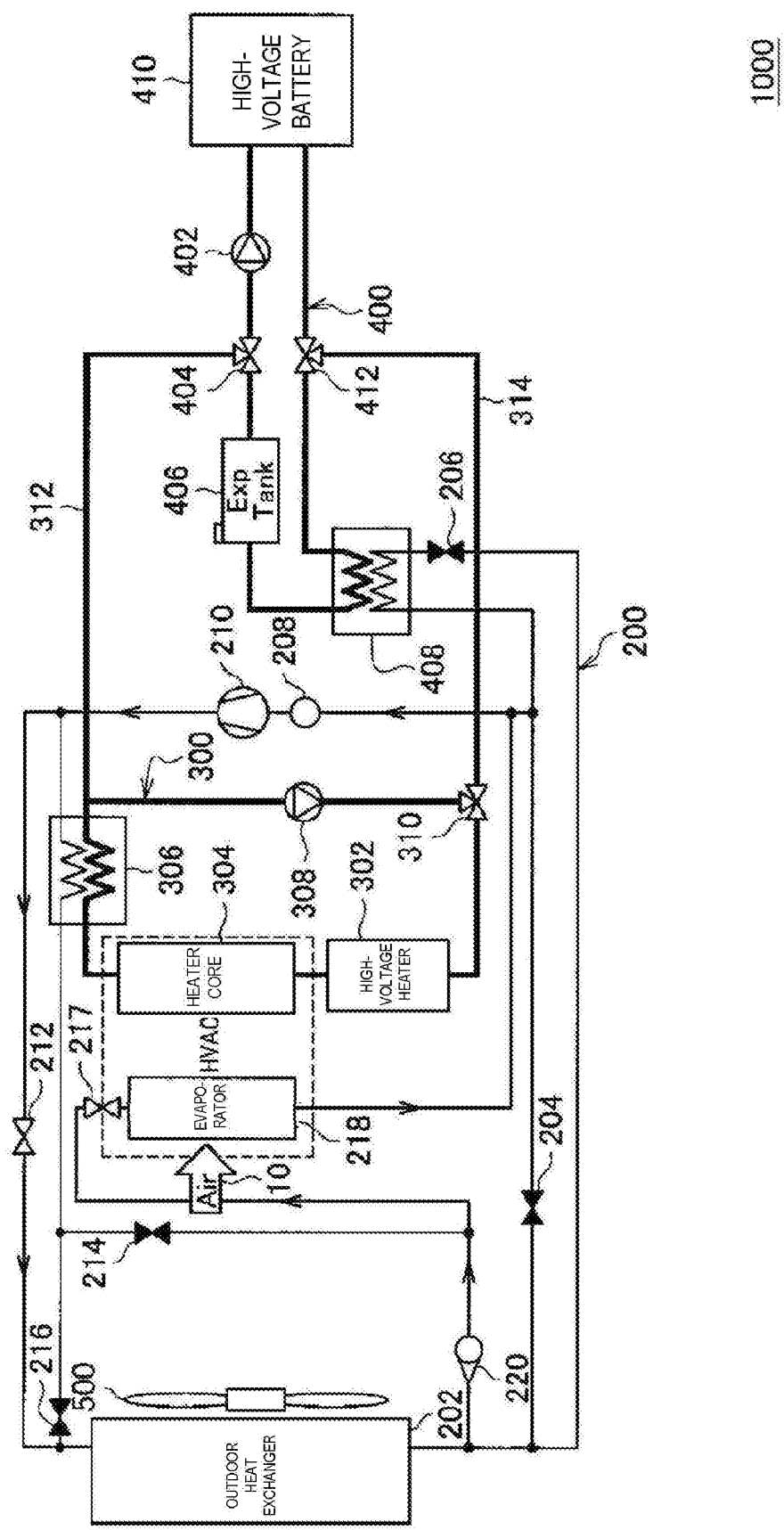
FIG. 2 is a schematic diagram illustrating operations when cooling a passenger compartment.

FIG. 2 is a schematic diagram illustrating operations when cooling the passenger compartment. Cooling of the passenger compartment is performed by the refrigerant circuit 200. FIG. 2 illustrates a state in which the heating circuit 300 and the battery temperature regulation circuit 400 are stopped. The refrigerant in the refrigerant circuit 200 flows in the direction indicated by the arrows in FIG. 2. As described above, air 10 sent to the evaporator 218 is cooled by the evaporator 218, and by introducing this air 10 into the passenger compartment, the passenger compartment is cooled.

2.2. Cooling High-Voltage Battery

Figure 3:
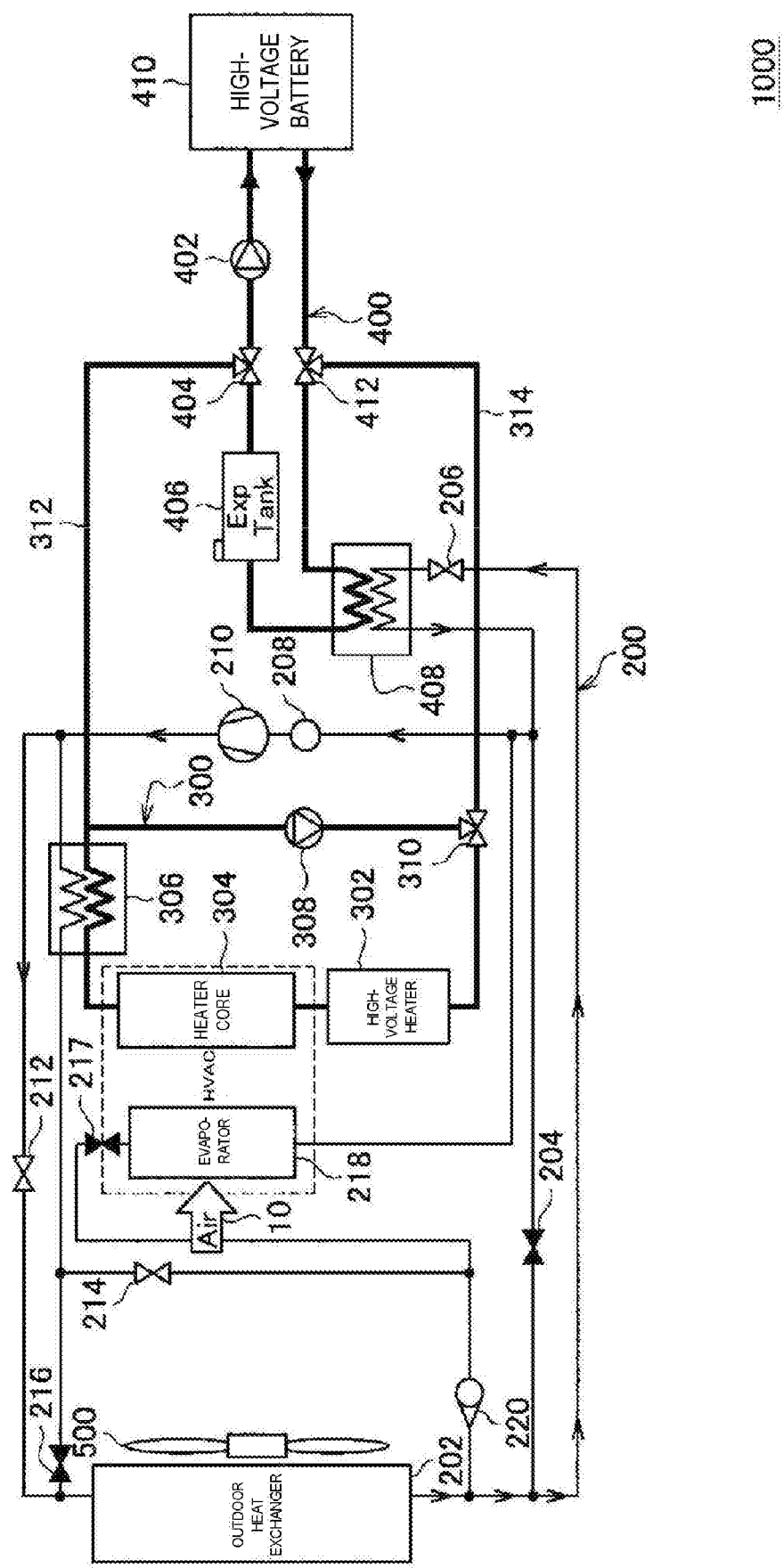
FIG. 3 is a schematic diagram illustrating operations when cooling a high-voltage battery.

FIG. 3 is a schematic diagram illustrating operations when cooling the high-voltage battery 410. In FIG. 3, the cooling of the high-voltage battery 410 is achieved by causing the refrigerant flowing through the refrigerant circuit 200 and the liquid flowing through the battery temperature regulation circuit 400 to exchange heat with each other in the chiller 408. Refrigerant compressed by the motorized compressor 210 is cooled by the outdoor heat exchanger 202, and by being injected into the chiller 408 by the chiller expansion valve 206, the refrigerant gasifies and cools the chiller 408. With this arrangement, the liquid flowing through the battery temperature regulation circuit 400 is cooled by the refrigerant flowing through the refrigerant circuit 200. FIG. 3 illustrates a state in which the heating circuit 300 is stopped.

2.3. Cooling Passenger Compartment and Cooling High-Voltage Battery

Figure 4:
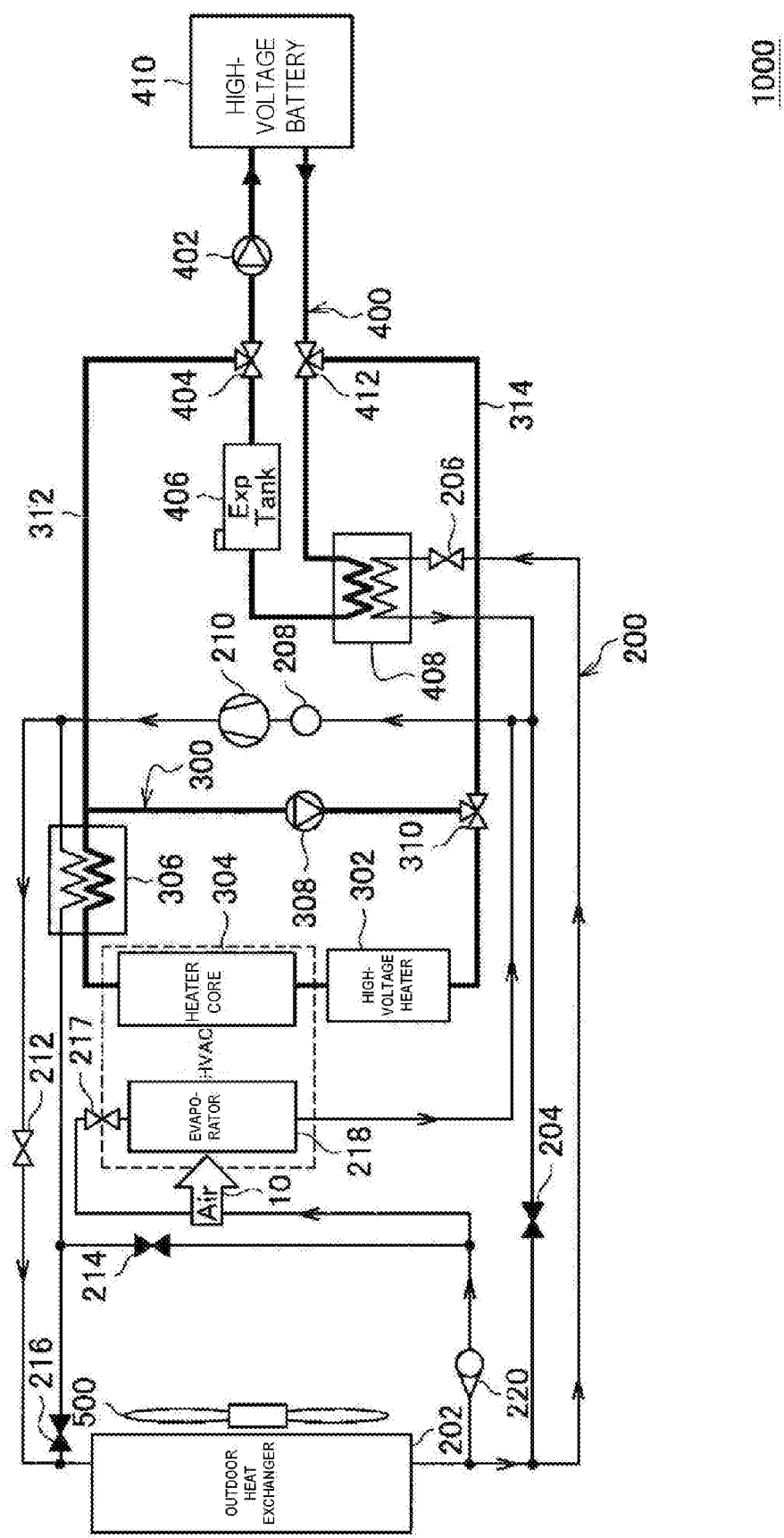
FIG. 4 is a schematic diagram illustrating operations in a case of both cooling the passenger compartment and also cooling the high-voltage battery.

FIG. 4 is a schematic diagram illustrating operations in a case of both cooling the passenger compartment and also cooling the high-voltage battery 410. By opening the chiller expansion valve 206 with respect to FIG. 2, the refrigerant flowing through the refrigerant circuit 200 and the liquid flowing through the battery temperature regulation circuit 400 exchange heat with each other in the chiller 408, and the high-voltage battery 410 is cooled. FIG. 4 illustrates a state in which the heating circuit 300 is stopped.

2.4. Dehumidifying Passenger Compartment

Figure 5:
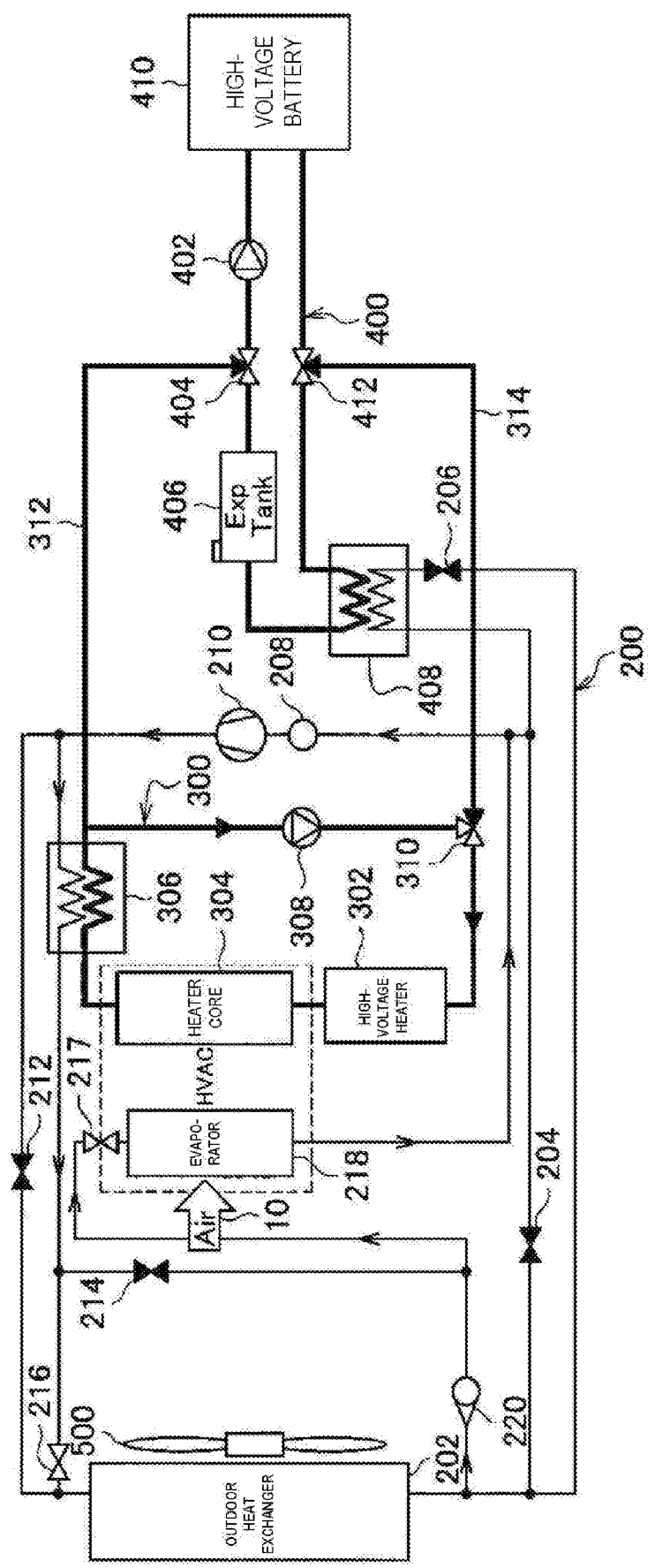
FIG. 5 is a schematic diagram illustrating operations when dehumidifying the passenger compartment.

FIG. 5 is a schematic diagram illustrating operations when dehumidifying the passenger compartment. FIG. 5 differs from FIG. 2 in that air that has been cooled and dehumidified by the evaporator 218 is reheated by the heater core 304. The refrigerant after exchanging heat in the evaporator 218 is in a high-temperature, high-pressure state. By causing liquid to flow through the heating circuit 300 by the operation of the water pump 308 and causing the liquid in the heating circuit 300 to exchange heat with the high-temperature, high-pressure refrigerant at the water-cooled condenser 306, the liquid in the heating circuit 300 is heated. At this time, as illustrated in FIG. 5, by closing parts of the three-way valve 310, the three-way valve 404, and the three-way valve 412, the liquid in the heating circuit 300 does not flow into the battery temperature regulation circuit 400. The air dehumidified by the evaporator 218 is warmed by the heater core 304 and introduced into the passenger compartment. In conditions in which the liquid in the heating circuit 300 is not given enough heat from the refrigerant, the high-voltage heater 302 is turned on to heat the liquid in the heating circuit 300 further.

2.5. Dehumidifying and Heating Passenger Compartment (1)

Figure 6:
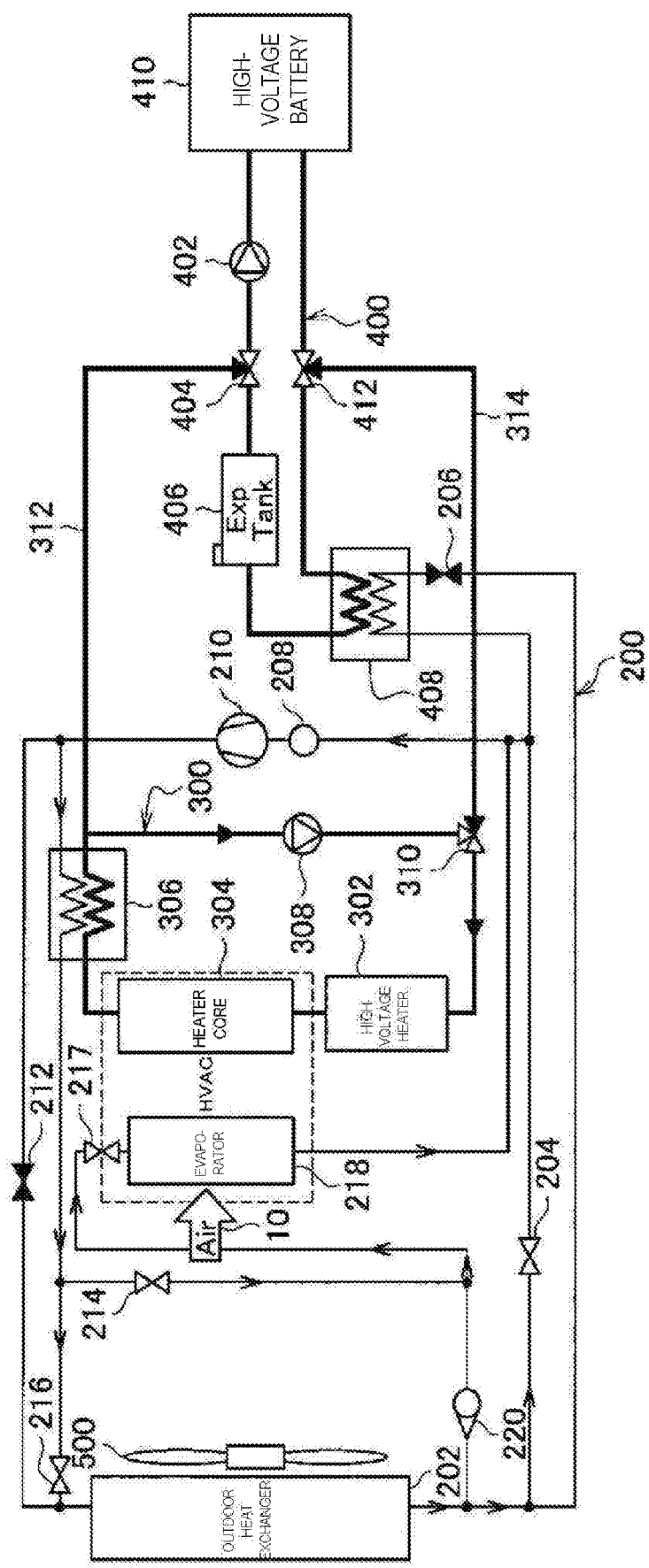
FIG. 6 is a schematic diagram illustrating operations when both dehumidifying and also heating the passenger compartment.

FIG. 6 is a schematic diagram illustrating operations when both dehumidifying and also heating the passenger compartment. In FIG. 6, a portion of the refrigerant in the refrigerant circuit 200 does not pass through the outdoor heat exchanger 202, and instead passes through the high-voltage solenoid valve 214 and is introduced into the evaporator 218. Liquid flows inside the heating circuit 300 by the operation of the water pump 308, and the liquid flowing through the heating circuit 300 is warmed by the water-cooled condenser 306. With this arrangement, the air dehumidified by the evaporator 218 is warmed by the heater core 304 and introduced into the passenger compartment.

2.6. Dehumidifying and Heating Passenger Compartment (2)

Figure 7:
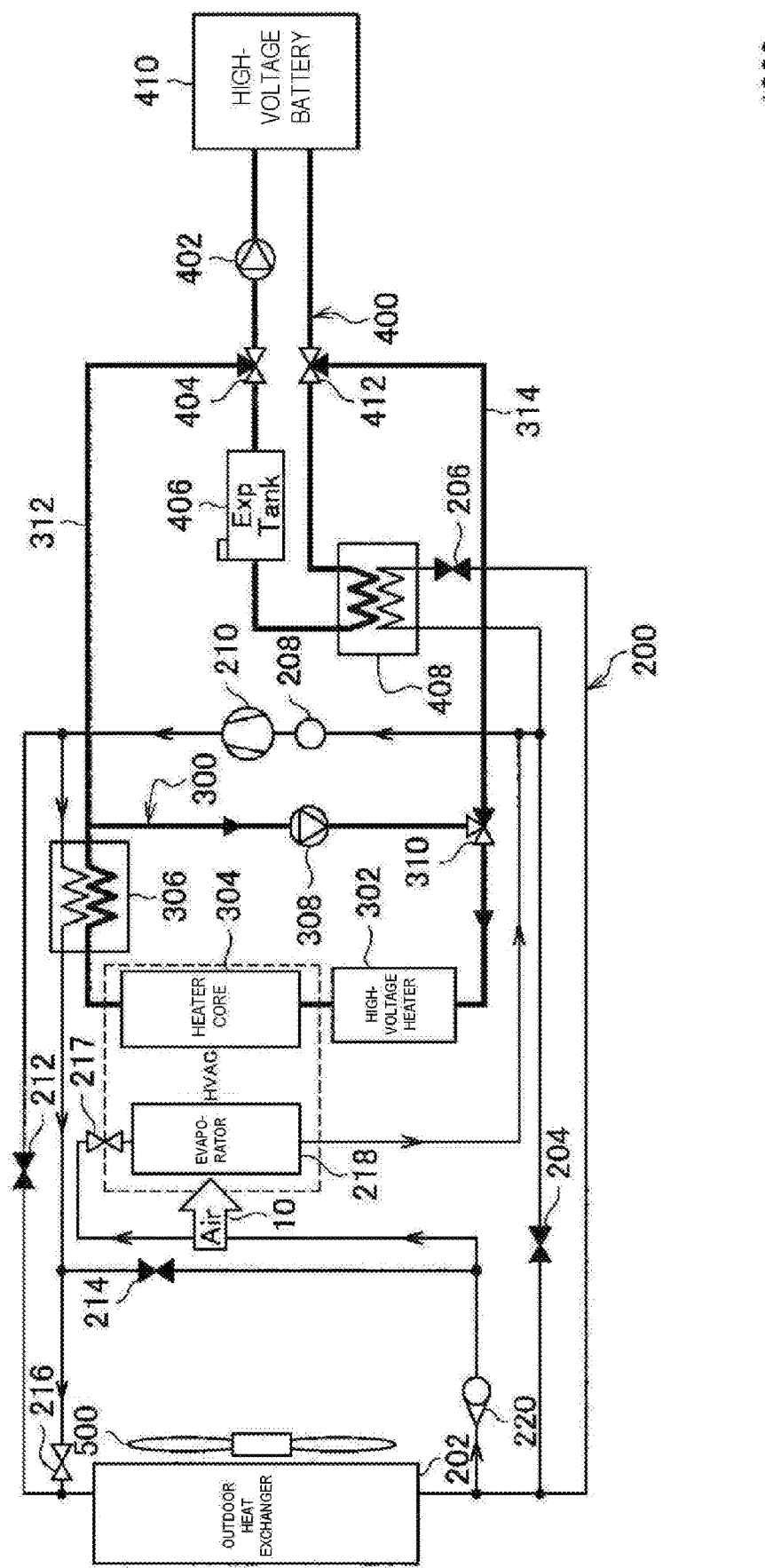
FIG. 7 is a schematic diagram illustrating a different example of operations when both dehumidifying and also heating the passenger compartment.

FIG. 7 is a schematic diagram illustrating a different example of operations when both dehumidifying and also heating the passenger compartment. The basic operations are similar to FIG. 6, but in FIG. 7, the high-voltage solenoid valve 214 and the low-voltage solenoid valve 204 are closed. The difference between FIGS. 6 and 7 is that, in FIG. 7, in the case in which the outdoor air temperature is low, the high-voltage heater 302 is turned on to ensure heating capacity when dehumidifying. On the other hand, in FIG. 6, in the case in which the outdoor air temperature is low, since the refrigerant bypasses the outdoor heat exchanger 202, it is possible to ensure heating capacity even without using the high-voltage heater 302. Note that, similarly to FIG. 5, FIGS. 6 and 7 illustrate a state in which the flow of liquid from the heating circuit 300 to the battery temperature regulation circuit 400 is stopped, and the battery temperature regulation circuit 400 is stopped.

2.7. Dehumidifying Passenger Compartment and Cooling High-Voltage Battery

Figure 8:
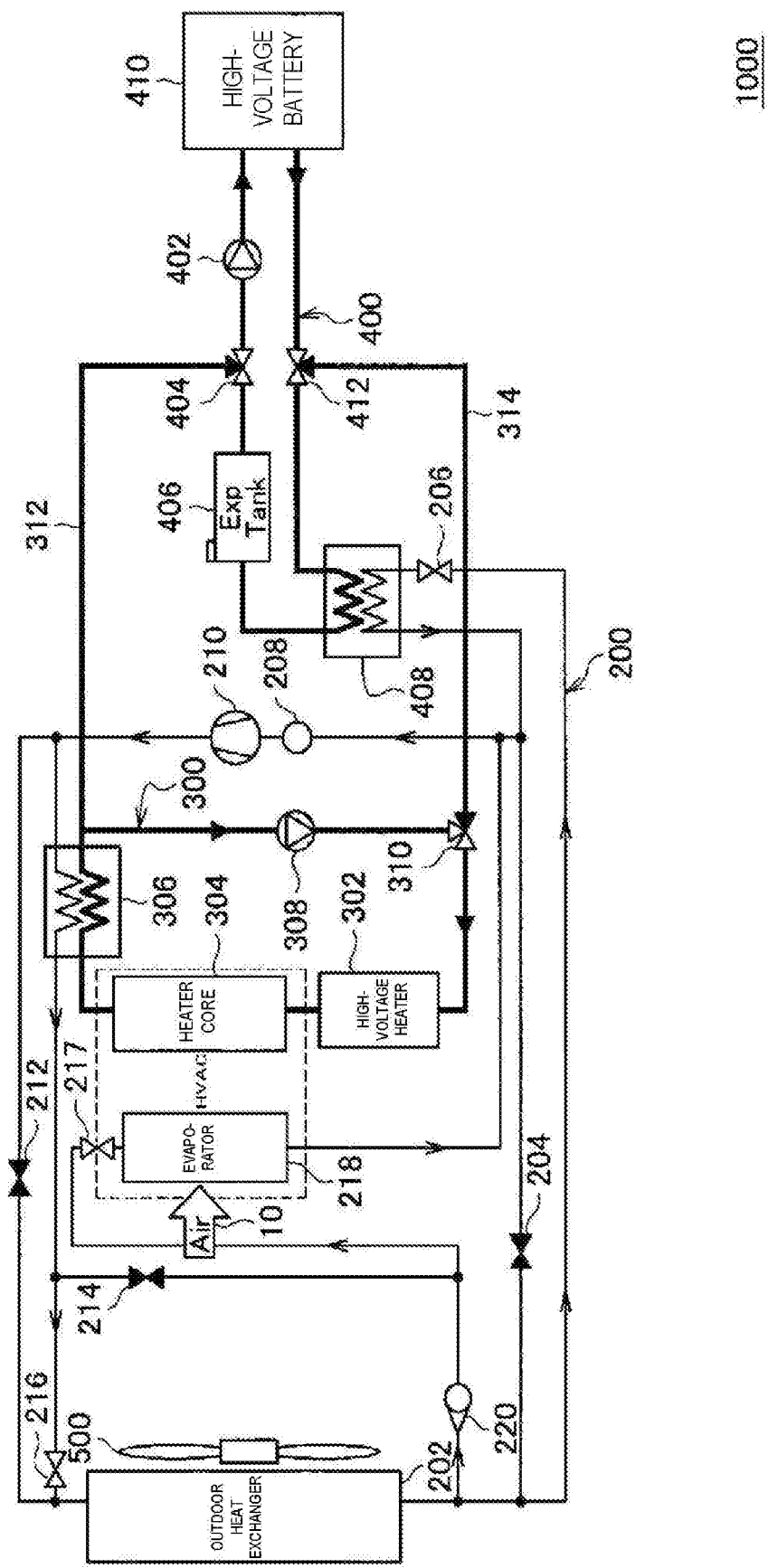
FIG. 8 is a schematic diagram illustrating the operations of both dehumidifying the passenger compartment and also cooling the high-voltage battery.

FIG. 8 is a schematic diagram illustrating the operations of both dehumidifying the passenger compartment and also cooling the high-voltage battery 410. With respect to FIG. 5, the chiller expansion valve 206 is opened. Refrigerant compressed by the motorized compressor 210 is cooled by the outdoor heat exchanger 202, and by being injected into the chiller 408 by the chiller expansion valve 206, the refrigerant gasifies and cools the chiller 408. The refrigerant flowing through the refrigerant circuit 200 and the liquid flowing through the battery temperature regulation circuit 400 exchange heat with each other in the chiller 408, and the high-voltage battery 410 is cooled. Dehumidification is performed similarly to FIG. 5.

Figure 9:
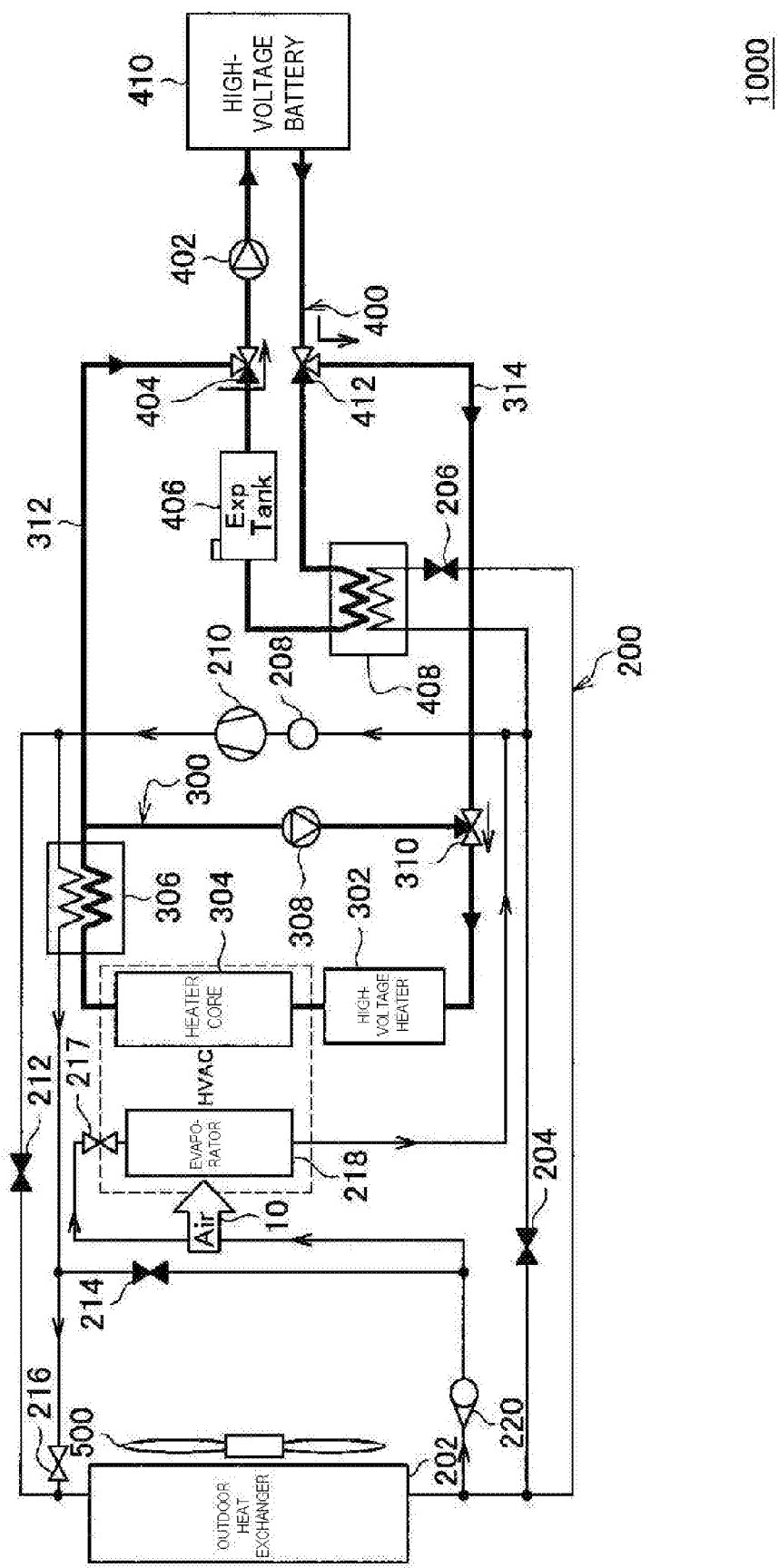
FIG. 9 is a schematic diagram illustrating the operations of both dehumidifying the passenger compartment and also warming up the high-voltage battery.

2.8. Dehumidifying Passenger Compartment and Warming Up High-Voltage Battery FIG. 9 is a schematic diagram illustrating the operations of both dehumidifying the passenger compartment and also warming up the high-voltage battery 410. The basic operations are similar to FIG. 5, but in FIG. 9, the liquid in the heating circuit 300 is introduced into the battery temperature regulation circuit 400. For this reason, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the operation of the water pump 402. By introducing the liquid in the heating circuit 300 into the battery temperature regulation circuit 400, it is possible to warm up the high-voltage battery 410. The air dehumidified by the evaporator 218 is warmed by the heater core 304 and introduced into the passenger compartment. In conditions in which the liquid in the heating circuit 300 is not given enough heat from the refrigerant, the high-voltage heater 302 is turned on to heat the liquid in the heating circuit 300 further.

2.9. Heating Passenger Compartment with Heat Pump Configuration

Figure 10:
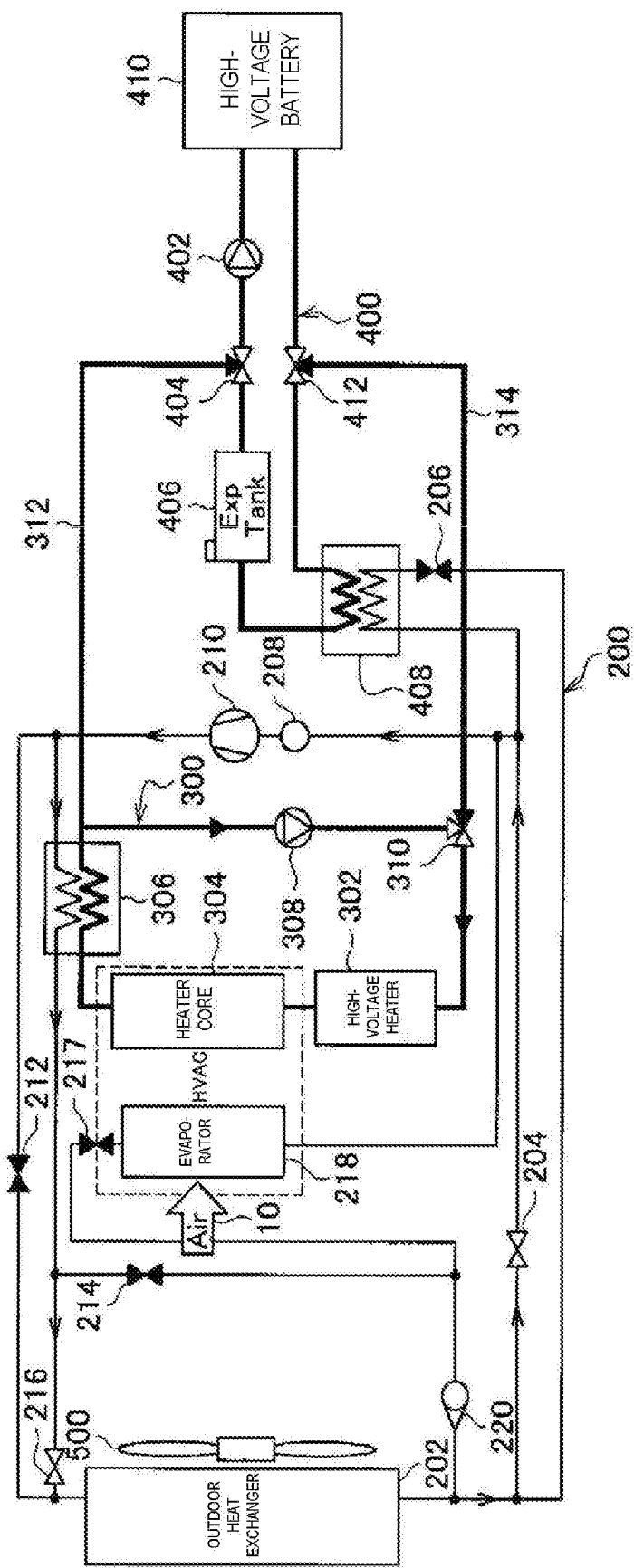
FIG. 10 is a schematic diagram illustrating the operations of heating the passenger compartment with a heat pump configuration.

FIG. 10 is a schematic diagram illustrating the operations of heating the passenger compartment with a heat pump configuration. By putting the refrigerant in a high-temperature, high-pressure state with the motorized compressor 210 and causing the liquid in the heating circuit 300 to exchange heat with the high-temperature, high-pressure refrigerant at the water-cooled condenser 306, the liquid in the heating circuit 300 is heated. Similarly to FIG. 5, the flow of liquid from the heating circuit 300 to the battery temperature regulation circuit 400 is stopped, and the battery temperature regulation circuit 400 is stopped. The air to be introduced into the passenger compartment is warmed by the heater core 304. In conditions in which the liquid in the heating circuit 300 is not given enough heat from the refrigerant, the high-voltage heater 302 is turned on to heat the liquid in the heating circuit 300 further.

2.10. Heating Passenger Compartment with High-Voltage Heater

Figure 11:
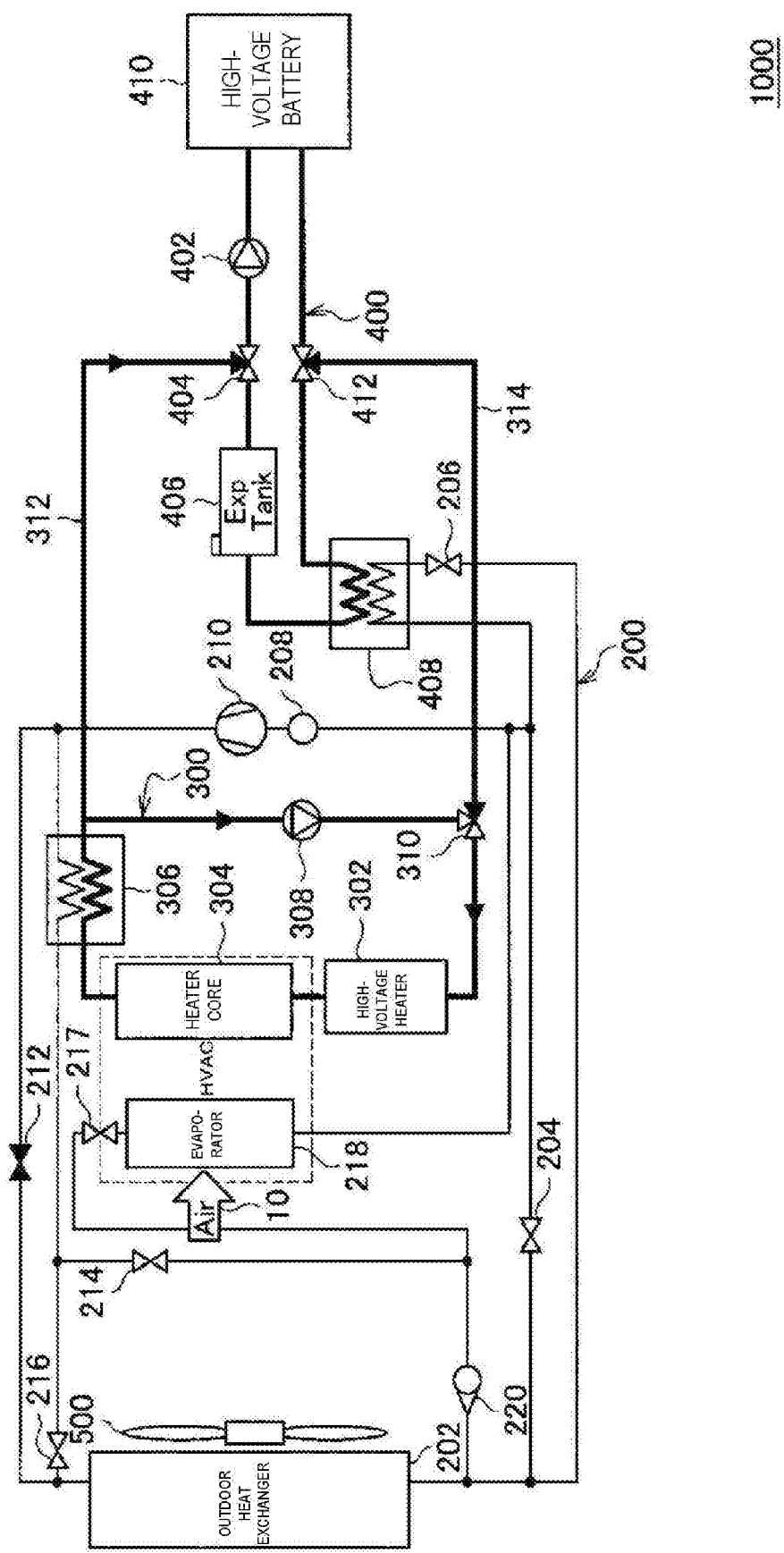
FIG. 11 is a schematic diagram illustrating the operations of heating the passenger compartment with a high-voltage heater.

FIG. 11 is a schematic diagram illustrating the operations of heating the passenger compartment with the high-voltage heater 302. By causing liquid in the heating circuit 300 to be heated by the high-voltage heater 302 and to exchange heat in the heater core 304, the passenger compartment is heated. The refrigerant circuit 200 is in a stopped state. Also, the flow of liquid from the heating circuit 300 to the battery temperature regulation circuit 400 is stopped, and the battery temperature regulation circuit 400 is stopped.

2.11. Warming Up High-Voltage Battery with Heat Pump

Figure 12:
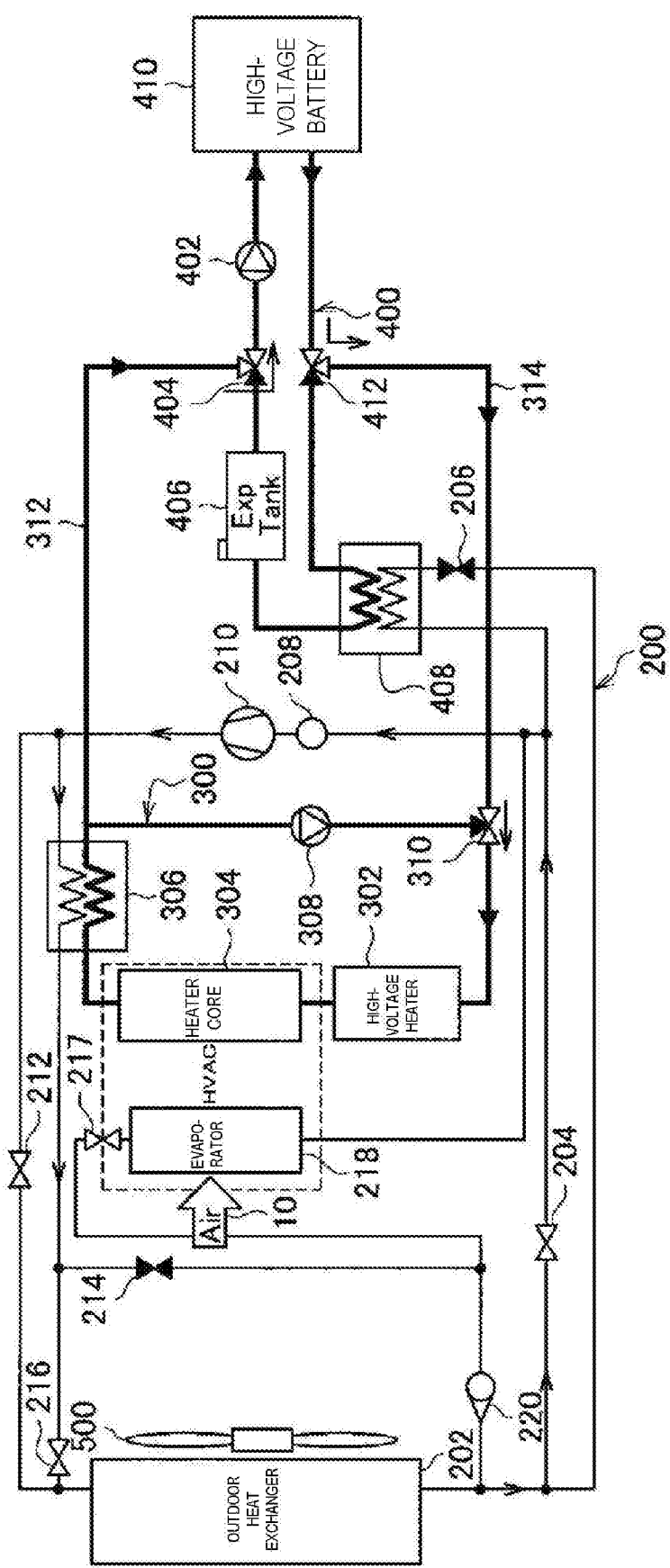
FIG. 12 is a schematic diagram illustrating the operations of warming up the high-voltage battery with a heat pump.

FIG. 12 is a schematic diagram illustrating the operations of warming up the high-voltage battery 410 with a heat pump. The basic operations are similar to FIG. 10, but in FIG. 12, the liquid in the heating circuit 300 is introduced into the battery temperature regulation circuit 400. For this reason, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the operation of the water pump 402. When warming up the high-voltage battery 410 with a heat pump, by putting the refrigerant in a high-temperature, high-pressure state with the motorized compressor 210 and causing the liquid in the heating circuit 300 to exchange heat with the high-temperature, high-pressure refrigerant at the water-cooled condenser 306, the liquid in the heating circuit 300 is heated. For this reason, the high-voltage heater 302 remains in the stopped state unless the outdoor air temperature becomes extremely cold (for example, −10° C. or less) Consequently, power consumption may be suppressed, and energy usage efficiency may be raised.

2.12. Warming Up High-Voltage Battery with High-Voltage Heater

Figure 13:
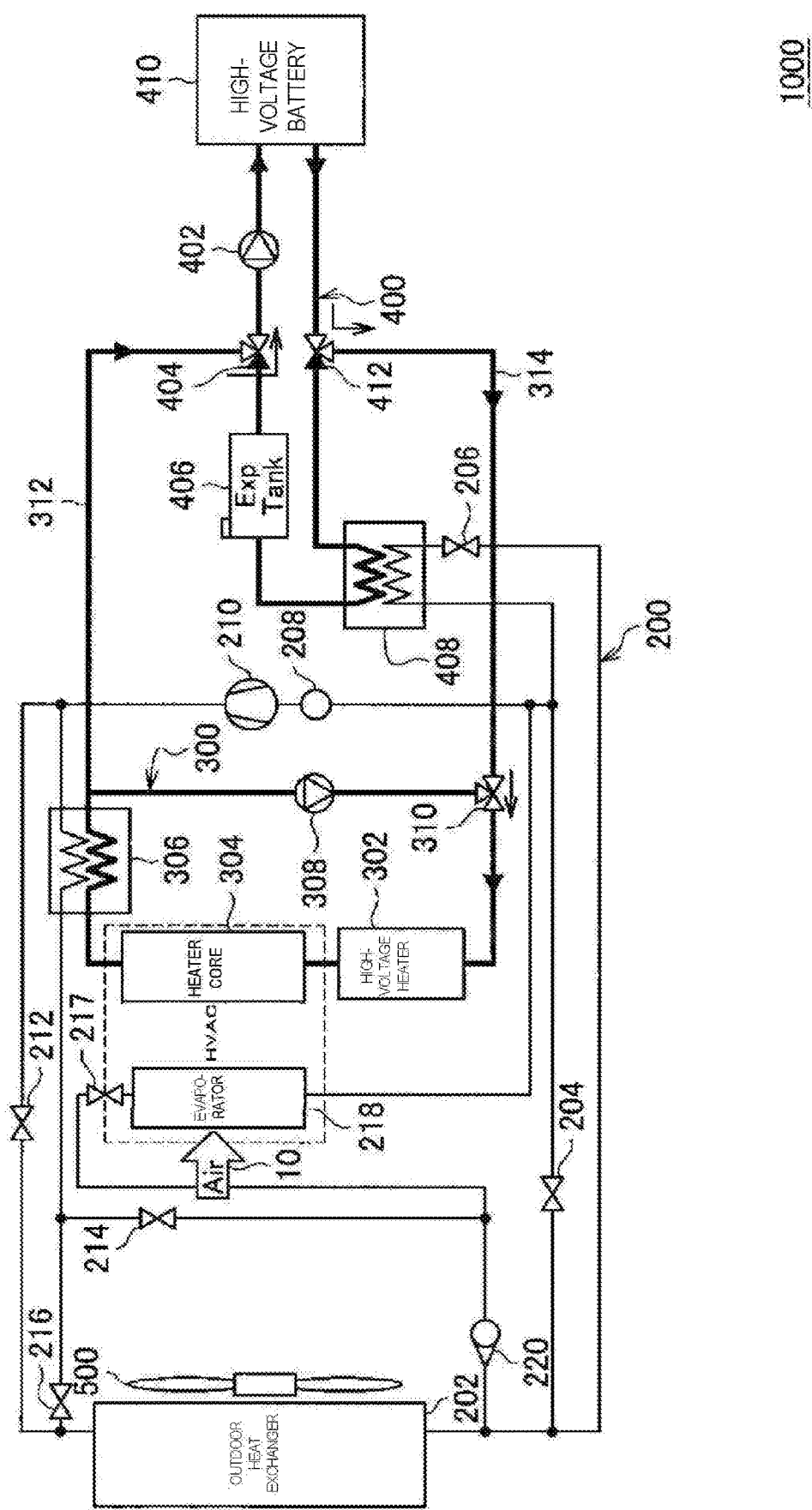
FIG. 13 is a schematic diagram illustrating the operations of warming up the high-voltage battery with a high-voltage heater.

FIG. 13 is a schematic diagram illustrating the operations of warming up the high-voltage battery 410 with the high-voltage heater 302. By causing the liquid in the heating circuit 300 to be heated by the high-voltage heater 302 and introduced into the battery temperature regulation circuit 400, the high-voltage battery 410 is warmed up. The refrigerant circuit 200 is in a stopped state. Likewise in FIG. 13, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the operation of the water pump 402.

As above, by basically using the refrigerant circuit 200 to exchange heat between refrigerant and air inside the passenger compartment and also to exchange heat between refrigerant and the liquid in the battery temperature regulation circuit 400, temperature regulation (cooling, heating) of the passenger compartment and temperature regulation of the high-voltage battery 410 are achieved. Furthermore, at extremely low temperatures, by coupling the heating circuit 300 and the battery temperature regulation circuit 400 to put both on the same circuit, it becomes possible to meet the temperature demand even at extremely low temperatures.

Although the preferred embodiment of the disclosure has been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

The invention claimed is:

1. A vehicle heat management system for a battery of a vehicle, the vehicle heat management system comprising: a refrigerant circuit including a compressor that compresses refrigerant in the refrigerant circuit a condenser that exchanges heat between circuits and an evaporator; a heating device, different from the refrigerant circuit that includes a heater that provides heat to liquid in the heating device and a heater core that warms air to be introduced into a passenger compartment of the vehicle by exchanging heat with liquid of the heating device, and that is coupled with the refrigerant circuit via the condenser; and a battery temperature regulation circuit that is coupled with the refrigerant circuit via a chiller to circulate the liquid that cooled by exchanging heat with the refrigerant circuit, and configured to be connected with the heating device to circulate the liquid circulating through the heating device into the battery temperature regulation circuit, wherein the heating device is configured to heat liquid, by the heater, warmed by exchanging heat, via the condenser, with the refrigerant compressed by the compressor in the refrigerant circuit when liquid in the heating device is not given enough heat from the refrigerant circuit, wherein air warmed by the heater core of the heating device is introduced into the passenger compartment of the vehicle, wherein the heating device is configured to warm liquid, in the battery temperature regulation circuit connected with the heating device, by exchanging heat, via the condenser, with the refrigerant compressed by the compressor in the refrigerant circuit, and wherein at extremely low temperatures, the refrigerant circuit stops, and the heating device circulates, in the battery temperature regulation circuit connected with the heating device, liquid heated by the heater.

2. The vehicle heat management system according to claim 1, wherein
the heating device and the battery temperature regulation circuit are configured to be connected, and
the liquid circulating through the heating device is introduced into the battery temperature regulation circuit.

3. The vehicle heat management system according to claim 2, further comprising:
a control valve configured to control an introduction of the liquid circulating through the heating device into the battery temperature regulation circuit, the control valve being disposed at a coupling between the heating device and the battery temperature regulation circuit.

4. The vehicle heat management system according to claim 3,
wherein
the heater operates when warming up the battery.

5. The vehicle heat management system according to claim 2, further comprising:
a first channel configured to introduce the liquid circulating through the heating device into the battery temperature regulation circuit; and
a second channel configured to return the liquid circulating through the battery temperature regulation circuit back to the heating device.

6. The vehicle heat management system according to claim 5,
wherein
the heater operates when warming up the battery.

7. The vehicle heat management system according to claim 2,
wherein
the heater operates when warming up the battery.

8. The vehicle heat management system according to claim 1, further comprising:
a first heat exchanger configured to exchange heat between the liquid that regulates the temperature of the battery and the refrigerant, wherein
the refrigerant circuit comprises a control valve configured to control an introduction of the refrigerant into the heat exchanger.

9. The vehicle heat management system according to claim 8, wherein
the refrigerant is introduced into the first heat exchanger by the opening of the control valve when cooling the battery.

10. The vehicle heat management system according to claim 9, further comprising:
a second heat exchanger configured to exchange heat between the liquid flowing through the heating device and the refrigerant.

11. The vehicle heat management system according to claim 8, further comprising:
a second heat exchanger configured to exchange heat between the liquid flowing through the heating device and the refrigerant.

* * * * *